US006625832B2

(12) United States Patent
Montague et al.

(10) Patent No.: US 6,625,832 B2
(45) Date of Patent: Sep. 30, 2003

(54) MULTI-FUNCTION TOOL WITH CARTRIDGE

(75) Inventors: Phillip A. Montague, Tualatin, OR (US); Edgar A. Dallas, Beaverton, OR (US); Bradford Parrish, Oregon City, OR (US); Peter Whitlock, Beaverton, OR (US); Paul W. Poehlmann, Heriot Bay (CA); Charlie Alfaro, Beaverton, OR (US); John Nason, Keizer, OR (US)

(73) Assignee: Alterra Holdings Corporation, Tigard, OR (US)

( * ) Notice: Subject to any disclaimer, the term of this patent is extended or adjusted under 35 U.S.C. 154(b) by 90 days.

(21) Appl. No.: 09/756,547

(22) Filed: Jan. 8, 2001

(65) Prior Publication Data

US 2002/0023302 A1 Feb. 28, 2002

Related U.S. Application Data

(63) Continuation-in-part of application No. 09/518,325, filed on Mar. 3, 2000, now Pat. No. 6,305,041, which is a continuation-in-part of application No. 09/368,781, filed on Aug. 5, 1999, which is a continuation of application No. 08/771,449, filed on Dec. 20, 1996, now Pat. No. 6,088,860.

(51) Int. Cl.[7] .................................................. B25B 7/22
(52) U.S. Cl. .......................................... 7/128; 81/427.5
(58) Field of Search ............................ 7/127, 128, 118; 81/124.5, 440, 416, 427.5; 16/110.1, 429

(56) References Cited

U.S. PATENT DOCUMENTS

| | | | | | |
|---|---|---|---|---|---|
| 1,227,333 | A | * | 5/1917 | SMith | 81/416 |
| 2,441,552 | A | * | 5/1948 | Barnes | 81/416 |
| 2,536,852 | A | * | 1/1951 | Middleton | 7/118 |
| 5,960,498 | A | * | 10/1999 | Nabors et al. | 7/128 |
| 6,038,723 | A | * | 3/2000 | Nabors et al. | 7/128 |
| 6,088,860 | A | * | 7/2000 | Poehlmann et al. | 7/128 |
| 6,088,861 | A | * | 7/2000 | Sessions et al. | 7/128 |
| 6,105,189 | A | * | 8/2000 | Nabors et al. | 7/128 |
| 6,233,769 | B1 | * | 5/2001 | Seber et al. | 7/128 |
| 6,243,901 | B1 | * | 6/2001 | Elsener et al. | 7/118 |
| 6,305,041 | B1 | * | 10/2001 | Montague et al. | 7/128 |
| 6,332,242 | B1 | * | 12/2001 | Chen | 16/429 |
| 2002/0062527 | A1 | * | 5/2002 | Harrison | 7/128 |

* cited by examiner

Primary Examiner—James G. Smith
(74) Attorney, Agent, or Firm—Foley & Lardner

(57) ABSTRACT

A multi-function tool includes a head, a pair of handles, and a plurality of ancillary tools. The head and tools are stored within the handles in a folded configuration. The ancillary tools are coupled to an interchangeable cartridge that resides within one or both of the handles. A wedge lock prevents a fully opened ancillary tool from closing unless the wedge lock is manually disengaged.

25 Claims, 9 Drawing Sheets

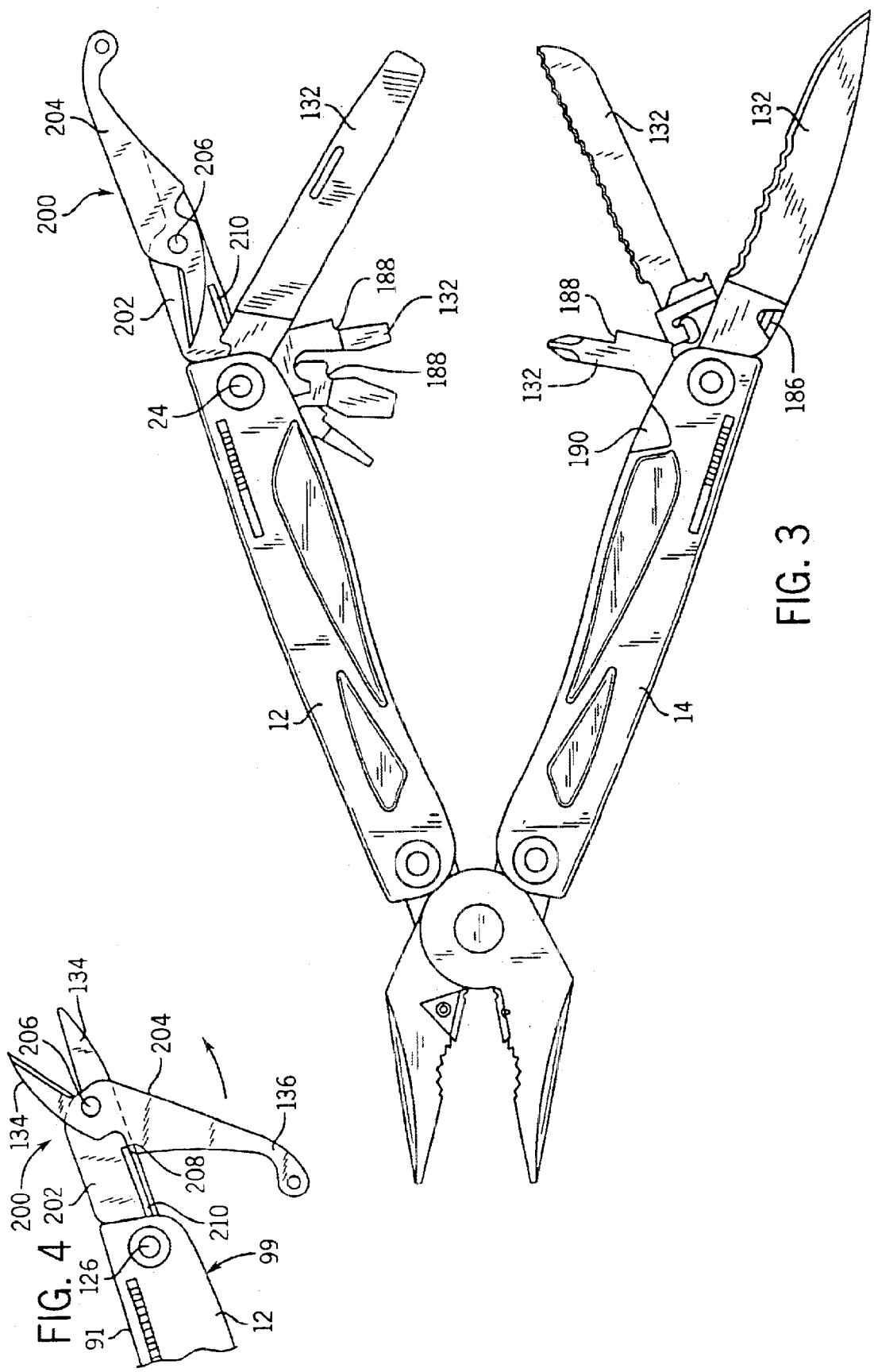

MULTI-FUNCTION TOOL WITH CARTRIDGE

This is a continuation-in-part of application Ser. No. 09/518,325, now U.S. Pat. No. 6,305,041 filed Mar. 3, 2000, which is a continuation of application Ser. No. 08/771,449, filed Dec. 20, 1996, now U.S. Pat. No. 6,088,860. This is also a continuation-in-part of application Ser. No. 09/368,781, filed Aug. 5, 1999.

FIELD OF THE INVENTION

The present invention relates generally to the field of mulit-function tools. More particularly, the present invention relates to a mulit-function tool having a tool cartridge containing a slide lock mechanism and a plurality of ancillary tools.

BACKGROUND OF THE INVENTION

Conventional multi-function tools generally have a pair of handles, a pliers head, and a variety of additional tools. The pliers head generally includes a pair of jaws that are attached to the handles. The jaws may be removable, or reversible, depending on the type of tool. The jaws can also have replaceable cutting inserts, such as those described in U.S. application Ser. No. 09/368,781, which is incorporated herein by reference. Types of additional implements include scissors, screwdrivers, files, knives, or bottle openers. U.S. Pat. Nos. 5,946,752 and 6,105,260 issued on Sep. 7, 1999 to Parrish and Aug. 22, 2000 to Parrish et al. disclose types of additional implements. These patents are incorporated herein by reference.

Conventional multi-function tools generally have the ability to fold into a compact state. This can be done by rotating the handles about the jaws to result in a position whereby the jaws are folded into the handles. This configuration is shown in U.S. Pat. No. 6,047,426 to McIntosh et al.

The tangs of the respective plier jaws can be slidably affixed to the respective handles such that the jaws can be slidably retracted into the interior of the handle channels. Examples of such multi-function tools are described in U.S. Pat. Nos. 5,142,721 and 5,212,844 issued on Sep. 1, 1992 and May 25, 1993, respectively to Sessions et al., and U.S. Pat. No. 6,088,860 issued Jul. 18, 2000 to Poehlmann et al. These patents are incorporated herein by reference.

Conventional multi-function tools typically have some means to lock the additional implements into the opened position. Types of locks include slide locks or liner locks.

One disadvantage of conventional multi-function tools is that the handles may not be biased into their operative and folded positions, respectively. Therefore, the handles may inadvertently come out of their folded configuration, or close when the user desires the handles to be in their open position.

Another disadvantage of conventional multi-function tools is that the additional implements may be directly attached to the handles via an axle. This creates both manufacturing and end-user difficulties. From the manufacturing standpoint, the manufacturer may wish to use a variety of different tool packages with a standardized set of multi-function tool handles. This is inefficient if the implements are individually directly attached to the handles. Additionally, if the end user wishes to replace one or more of the ancillary implements, or disassemble the handles for some reason, removal of the sides of the handles disassembles all of the ancillary implements simultaneously, creating reassembly difficulties.

Another disadvantage of conventional multi-function tools is that the handles are difficult to manufacture because of the difficulty in aligning the two sides of the handles to create a flat exterior surface.

Another disadvantage of conventional multi-function tools is that the cutting or wire stripping portion of the pliers head is not replaceable. Therefore, if the cutting insert becomes damaged or dull, the entire head of the tool must be replaced, if that is even possible, rather than simply replacing the cutting insert.

Another disadvantage of conventional multi-function tools is that the anti-rotational washers that may be used to prevent transmission of torque between the ancillary implements have fingers that extend into a slot in the handles. The slot extends through the handle, and therefore may be viewed from the exterior of the tool.

Another disadvantage of conventional multi-function tools is that the handles may have a cut-out portion to allow a user to access folded interior tools. This design relies on the user's ability to engage the folded tools with a thumb or fingernail. Additionally, the cut-out portion detracts from the overall aesthetic appearance of the multi-function tool.

Accordingly, it would be advantageous to have a mulit-function tool in which the handles are biased in both the opened and closed positions. Further, it would be advantageous to have a mulit-function tool with a replaceable cutting insert in the head. Further, it would be advantageous to have a multi-function tool that has a tool cartridge that may be separately installed into the handles. Further, it would be advantageous to have a multi-function tool that does not have a through slot in the handles to engage the fingers of anti-rotational washers. Further, it would be advantageous to have a multi-function tool that has a handle design that allows for easy manufacture. Further, it would be advantageous to have a multi-function tool that does not have a cut-out portion in the handle through which the user must extend a finger or a thumbnail to engage one of the retracted tools.

SUMMARY OF THE INVENTION

One embodiment of the invention relates to a multi-function tool having a head with a first jaw and a second jaw joined at an axis. The first and second jaws each have a working portion and a tang. A first handle is coupled to the first jaw, and the first handle has a first channel. A second handle is coupled to the second jaw, and the second handle has a second channel. A first tool cartridge is captured in the first channel. The tool cartridge has a first cartridge axle and a plurality of ancillary tools that are pivotally coupled to the first cartridge axle. A wedge lock releasably locks one or more of the ancillary tools into an open position.

A further embodiment of the invention relates to a multi-function tool having a head with a first jaw and a second jaw joined at an axis. A first handle is coupled to the first jaw, and the first handle has a channel. A second handle is coupled to the second jaw. A first scissors piece is pivotally secured to the first handle. A second scissors piece is pivotally secured to the first scissors piece at a scissors axle. The second scissors piece has a working portion and a tang. The two scissors pieces have a first configuration suitable for storage in the channel, and a second configuration suitable for operation, wherein the tang is positioned above the channel in the second configuration.

A further embodiment of the invention relates to a multi-function tool having a head with a first jaw and a second jaw joined at an axis. The first and second jaws have a working portion and a tang. A first handle is coupled to the first jaw and a second handle is coupled to the second jaw. The handles have a folded configuration and an unfolded configuration. A spring in the head biases the working portions apart from one another, wherein the handles are biased in an open position when the handles are in the unfolded configuration and the handles are biased in a closed position when the handles are in the folded configuration.

A further embodiment of the invention relates to a method of operating a multi-function tool. The tool has a scissors tool including a first piece and a second piece. The method includes the steps of unfolding the scissors tool by rotating the scissors tool in a first direction of rotation, and replacing the scissors tool in an operative configuration by rotating the second piece relative to the first piece in a second direction of rotation that is opposite of the first direction of rotation.

A still further embodiment of the invention relates to a multi-function tool having a head with a first jaw and a second jaw joined at an axis. The first jaw has a working portion and a tang, and the second jaw has a working portion and a tang. A first handle is coupled to the first jaw at a first axle and a second handle is coupled to the second jaw at a second axle. A replaceable cutting insert is coupled to the head. The cutting insert has two pieces, one coupled to each of the jaws. The pieces each have a notch.

A still further embodiment of the invention relates to a mulit-function tool having a head with a first jaw and a second jaw joined at an axis. A first handle is coupled to the first jaw, and the first handle has a first channel. A second handle is coupled to the second jaw, and the second handle has a second channel. The first and second handles each have a first side and a second side. The first side of each handle has a tongue, and the second side of each handle has a groove configured to receive the tongue.

A still further embodiment of the invention relates to a mulit-function tool having a head with a first jaw and a second jaw joined at an axis. The first and second jaws each have a working portion and a tang. The first handle is coupled to the first jaw, and a second handle is coupled to the second jaw. The first and second handles each have a channel. The handles have a folded configuration and an unfolded configuration. A cam surface is on each of the tangs and a spring arm is coupled to each handle. Each spring arm is configured to engage one of the cam surfaces wherein the handles snap into the folded configuration due to the interaction between the spring arm and the cam surface, and wherein the handles snap into the unfolded configuration due to the interaction between the spring arm and the cam surface.

A further embodiment of the invention relates to a method of manufacturing or repairing the handle of a multi-function tool. The handle has a first side and a second side. The method includes the steps of providing a tool cartridge having a plurality of ancillary tools, inserting the tool cartridge between the two sides of the handle, and fastening the sides together using a plurality of fasteners. The tool cartridge is captured between the first and second sides.

A still further embodiment of the invention relates to a tool cartridge for a multi-function tool. The tool cartridge includes a first side, and a second side. A bottom connects the first and second sides. A cartridge axle is disposed between the first and second sides, and a plurality of ancillary tools are pivotally connected to the cartridge axle. A wedge lock releasably locks one or more of the ancillary tools into an open position.

A still further embodiment of the invention relates to a handle for a multi-function tool. The handle has a first side with a tongue and a first interior surface. The handle has a second side with groove configured to receive the tongue and a second interior surface. The first side is coupled to the second side such that the first interior surface faces the second interior surface. Each of the interior surfaces has at least one recess shaped to receive and hold captive an additional component.

A still further embodiment of the invention relates to a mulit-function tool having a head with a first jaw and a second jaw joined at an axis. The first and second jaws each have a working portion and a tang. A first handle is coupled to the first jaw. A second handle is coupled to the second jaw. The plurality of ancillary tools are pivotally coupled to one of the handles. A wedge lock is coupled to one of the handles, wherein the wedge lock is configured to selectively lock a plurality of the ancillary tools into a fully opened position or bias a plurality of the ancillary tools into a fully folded position.

A still further embodiment of the invention relates to a tool cartridge for a multi-function tool. The tool cartridge has a first side with a first keyed aperture defined therein. The tool cartridge has a second side having a second aperture defined therein. A bottom connects the first and second sides, and a cartridge axle having a keyed head is disposed between the first and second sides. A plurality of ancillary tools are pivotally connected to the cartridge axle, and the keyed head is configured to travel through the first keyed aperture to clamp the plurality of ancillary tools together.

BRIEF DESCRIPTION OF THE DRAWINGS

The invention will hereafter be described with reference to the accompanying drawings, wherein like reference numerals denotes like elements, and:

FIG. 3 is a side view of the multi-function tool in the unfolded position with ancillary tools opened from the handles;

FIG. 4 is a fragmentary side view showing an end of one of the handles with a scissors tool in the fully opened position;

DETAILED DESCRIPTION OF THE PREFERRED EMBODIMENTS

Figure 1:
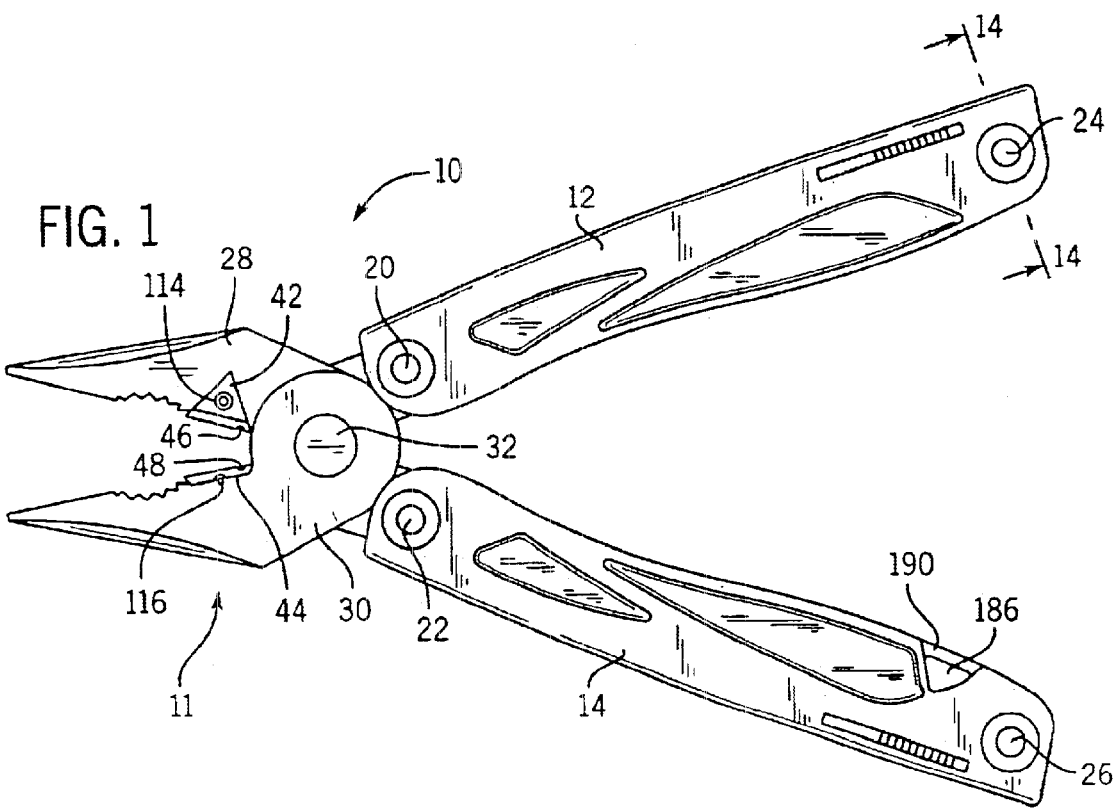
FIG. 1 is a side view of the multi-function tool of the present invention in an unfolded position.

Referring to FIG. 1, a multi-function tool 10 has a head 11, and a pair of handles 12, 14. The handles 12, 14 have a first axle 20, 22 on one end to which the head 11 is coupled. A second axle 24, 26 extends through a tool cartridge 16 (FIG. 5) that resides within each handle 12, 14.

Figure 2:
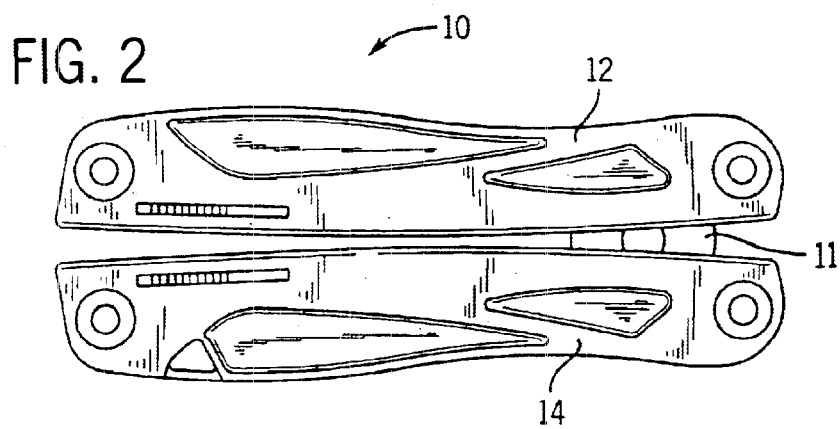
FIG. 2 is a side view of the multi-function tool in a folded position.

Referring to FIGS. 2 and 3, the handles 12, 14 have a folded configuration as shown in FIG. 2 and an unfolded configuration as shown in FIG. 3. As shown in FIG. 3, a variety of ancillary tools 132 may be coupled to the handles 12, 14.

Figure 8:
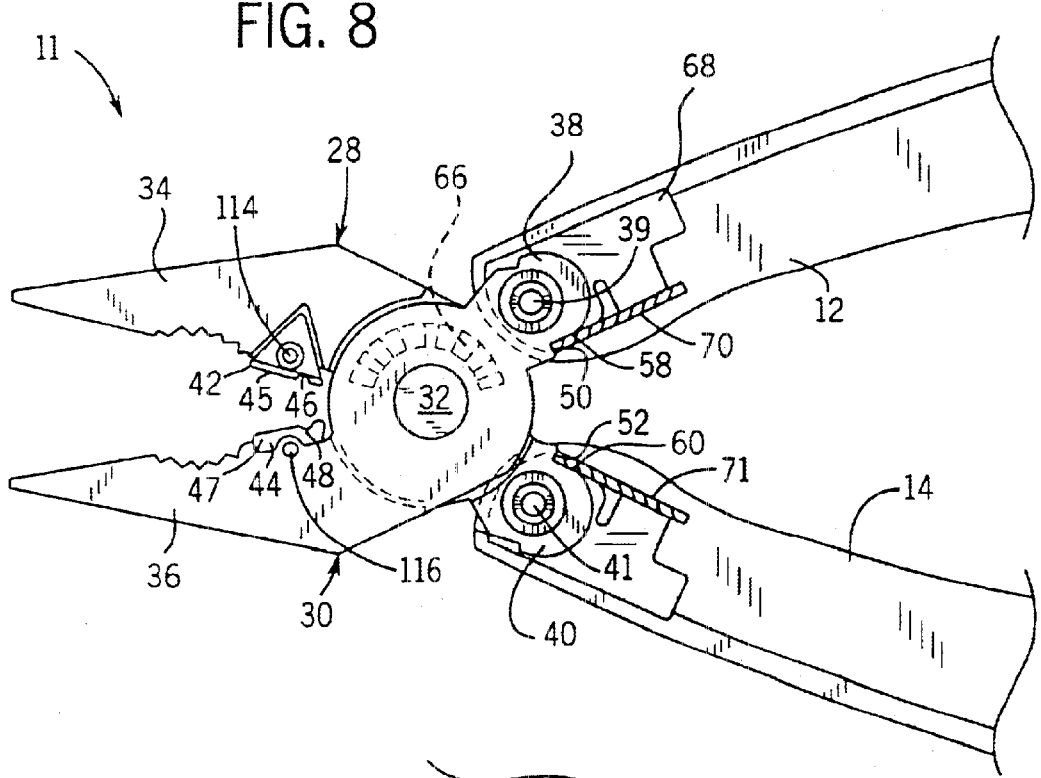
FIG. 8 is a fragmentary sectional view showing the jaws and a portion of the handles of the multi-function tool with the handles in the unfolded configuration.

Referring to FIG. 8, the head 11 includes a pair of jaws 28, 30 coupled together at an axis 32. Each jaw has a working portion 34, 36 and an opposed jaw tang 38, 40. The jaws 28, 30 work together to function as a pliers-type of tool. Closing force is applied by the handles 12, 14, which are coupled to the jaw tangs 38, 40. Within the head 11 is a head spring 66 that biases the jaws 28, 30 into the opened position. In an exemplary embodiment, the head spring 66 is a coil spring disposed in a channel formed by the jaws 28, 30.

Each jaw 28, 30 has a removable cutting insert 42, 44. A threaded aperture 116 in the location of each cutting insert 42, 44 receives a fastener 114 that attaches the cutting insert 42, 44 to the jaw. The fastener 114 permits easy installation and removal of the cutting inserts 42, 44. The cutting inserts 42, 44 are recessed into the working portion 34, 36 to avoid interference with other components. When the jaws 28, 30 are closed together, the cutting inserts 42, 44 work together to cut material placed therebetween. The cutting inserts 42, 44 each have a notch 46, 48 that may be used to strip wires. The notch 46, 48 can be of various sizes for different applications. In one embodiment the notches 46, 48 create an aperture when the jaws 28, 30 are closed. In another, the notches 46, 48 cut through items placed therebetween. The cutting inserts 42, 44 can have multiple cutting edges allowing rotation of the cutting insert 42, 44.

Each cutting insert 42, 44 has a beveled region 45, 47 that terminates in a cutting edge. The angle of the beveled region 45, 47 can vary depending on the preferred use of the cutting inserts 42, 44. Additionally, because the cutting inserts 42, 44 are removable and rotatable, each cutting insert 42, 44 can have three different beveled regions 45, 47 with different bevel angles to allow the user to selectively choose the preferred configuration.

While in a preferred embodiment the jaws 28, 30 combine to make a pair of pliers, in alternative embodiments the head 11 could be any type of tool that uses two jaws 28, 30.

The jaws 28, 30 are preferably made of steel, but may also be made of other suitable materials such as aluminum. The cutting inserts 42, 44 preferably are made of a hardened tool steel and have a tungsten carbide cutting surface to provide added wear resistance. However, a benefit of having a removable cutting insert 42, 44 is that by simply removing the fasteners 114, the cutting insert 42, 44 may be easily rotated or replaced by the user.

Figure 9:
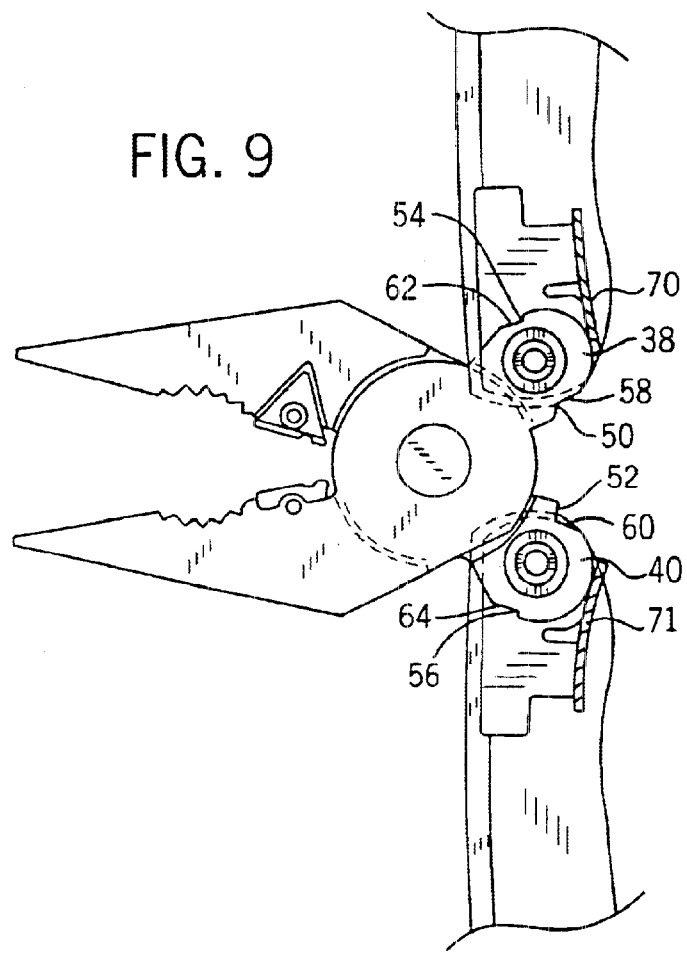
FIG. 9 is a fragmentary sectional view showing the jaws and a portion of the handles of the multi-function tool with the handles in an intermediate position between the folded and unfolded positions.

Referring to FIG. 9, each jaw tang 38, 40 has a first detent 50, 52 and a second detent 54, 56. Each jaw tang 38, 40 has a first flattened portion 58, 60 adjacent first detent 50, 52 and a second flattened portion 62, 64 adjacent second detent 54, 56. Thus jaw tangs 38, 40 act as a cam.

Referring to FIGS. 8 and 9, each handle 12, 14 has a spring arm 70, 71 that rides on the cammed surface of tangs 38, 40. Thus, handles 12, 14 have two preferred positions. The handles snap into the folded position when the ends of the spring arms 70, 71 snap into position on the second flattened portion 62, 64. The handles 12, 14 snap into the unfolded position when ends of spring arms 70, 71 snap into position on the first flattened portion 58, 60, as shown in FIG. 8. Thus, the handles 12, 14 are biased in the fully unfolded or fully folded positions.

Figure 5:
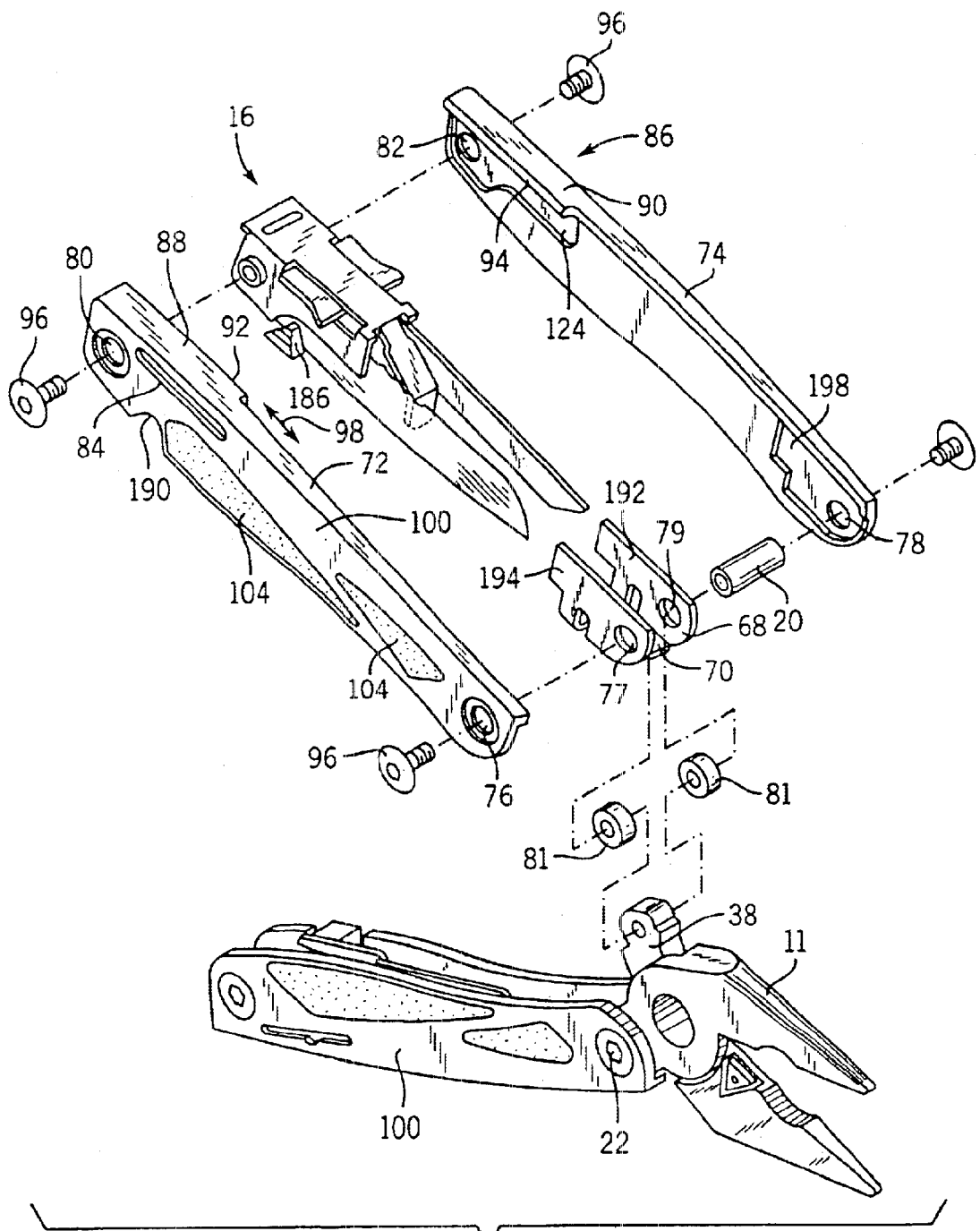
FIG. 5 is an exploded view of the multi-function tool showing the construction of one of the handles.
Figure 14:
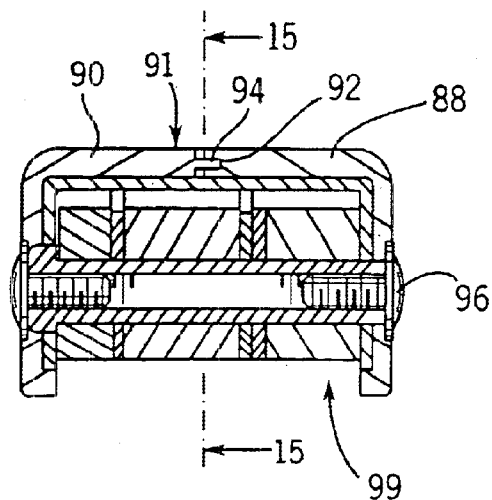
FIG. 14 is a sectional view taken generally along line 14—14 of FIG. 1.
Figure 18:
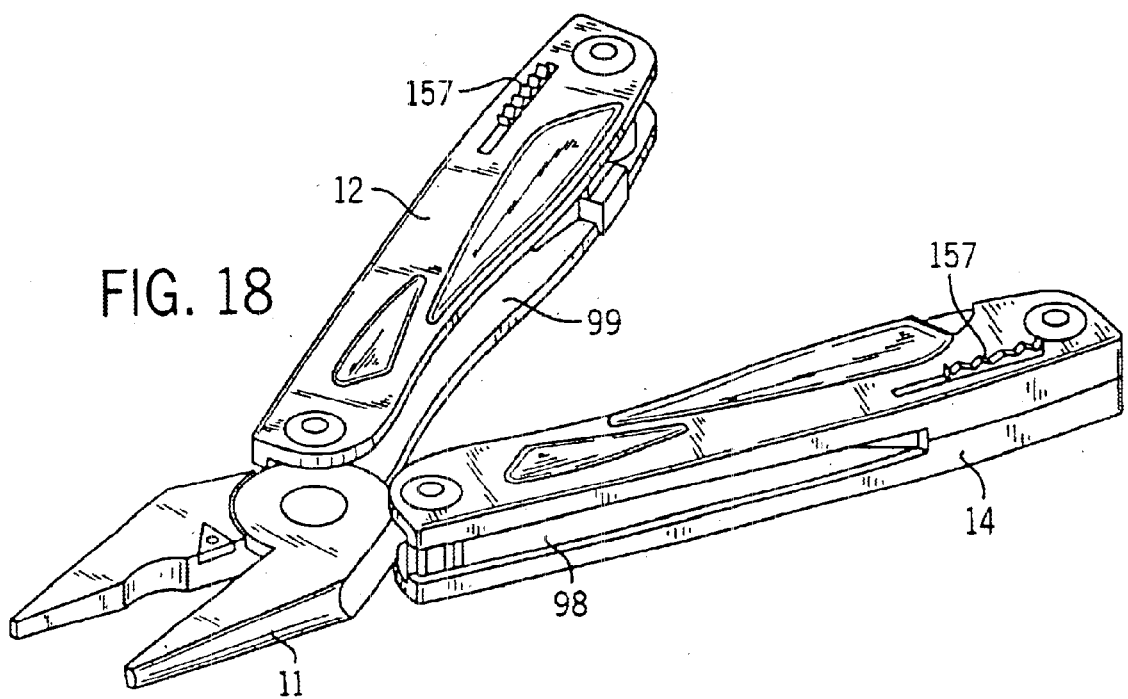
FIG. 18 is a perspective view of the multi-function tool.

Referring to FIG. 5, the construction of the handle 12 is shown. The other handle 14 is of similar construction. For convenience, reference numerals will only be used for handle 12. The handle 12 has first side 72 and second side 74. Each side 72, 74 has a first aperture 76, 78 on one end and a second aperture 80, 82 on the other end. Proximate second aperture 80, 82 is a handle slot 84, 86. The first side 72 has a first flange 88 extending perpendicularly therefrom. The second side 74 has a second flange 90 extending perpendicularly therefrom. The first flange 88 has a groove 92 (FIG. 14). The second flange 90 has a tongue 94 (FIG. 14). The sides 72, 74 can be attached together by screws 96 that are threaded into axles 20, 22, 24, 26. Thus, the screws 96 not only join the handle sides 72, 74 but help maintain the tool cartridge 116 and spring arm insert 68 in position by fixing the axles 20, 22, 24, 26 with respect to the handle sides 72, 74. The tongue 94 and groove 92 fit together when the first side and second side are assembled to create a three-sided channel 99 (FIGS. 14 and 18). A web 91 (FIG. 14) is created by the two joined flanges 88, 90. The remaining portion of the assembled handle has a longitudinal slot or opening 98 between the two sides 72, 74 of the handle 12 (FIG. 18).

Figure 7:
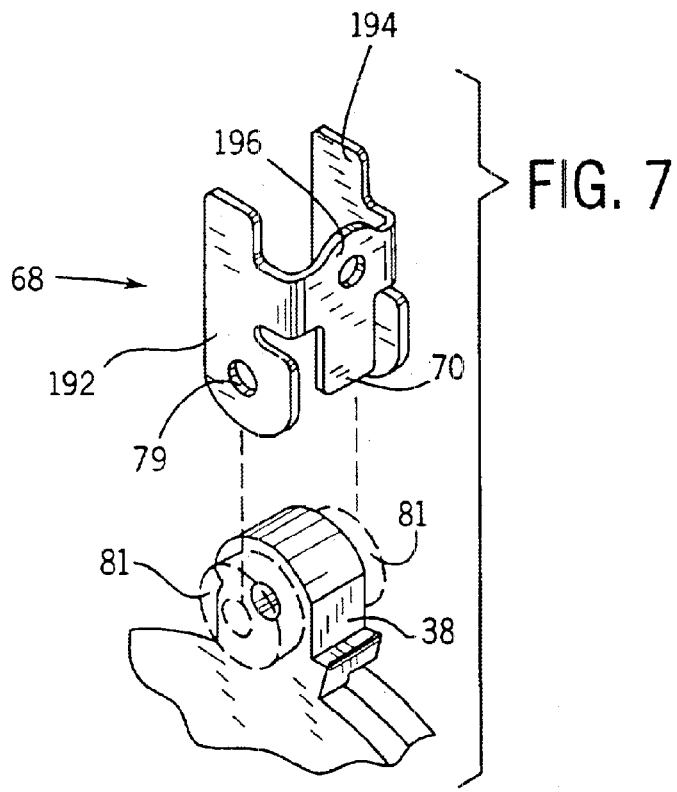
FIG. 7 is a fragmentary exploded perspective view showing the assembly of the spring clip to the tang of one of the jaws of the multi-function tool.

Referring to FIGS. 5 and 7, the handle 12 may be attached to the head 11 in the following manner. A spring arm insert 68 has a pair of spring arm insert apertures 77, 79 that line up with the first handle apertures 76, 78. Accordingly, the first and second handle sides 72, 74 and the spring arm insert 68 may be coupled to the first axle 20 along with the tang 38. A pair of spacers 81 may also be coupled to the first axle 20 on either side of the tang 38. When the screws 96 are threaded into the first axle 20, the handle 12 is thereby rotatably coupled to the head 11.

Because each handle 12, 14 is constructed using two separate sides 72, 74 and fasteners 96, components may be inserted and removed after assembly of the handles 12, 14. Additionally, interchangeable components, such as spring arm insert 68 may be captured between the two sides of each handle once the two sides are attached.

The handles 12, 14 are assembled by first inserting any desired interchangeable components between the two handle sides 72, 74. The tongue 94 and groove 92 are meshed to ensure that the web 91 is flat. The screws 96 can then be used to complete the assembly.

The handles 12, 14 are preferably made of steel or aluminum. Exterior surface 100 of handles 12, 14 has textured surface areas 104 to provide extra gripping ability as well as a more comfortable fit in the user's hand.

Referring to FIGS. 1 and 2, once assembled, each handle 12, 14 has a curved profile. The curved structure allows the tool to fit better into user's hand both when handles 12, 14 are in the opened position, as well as in the folded position.

Figure 6:
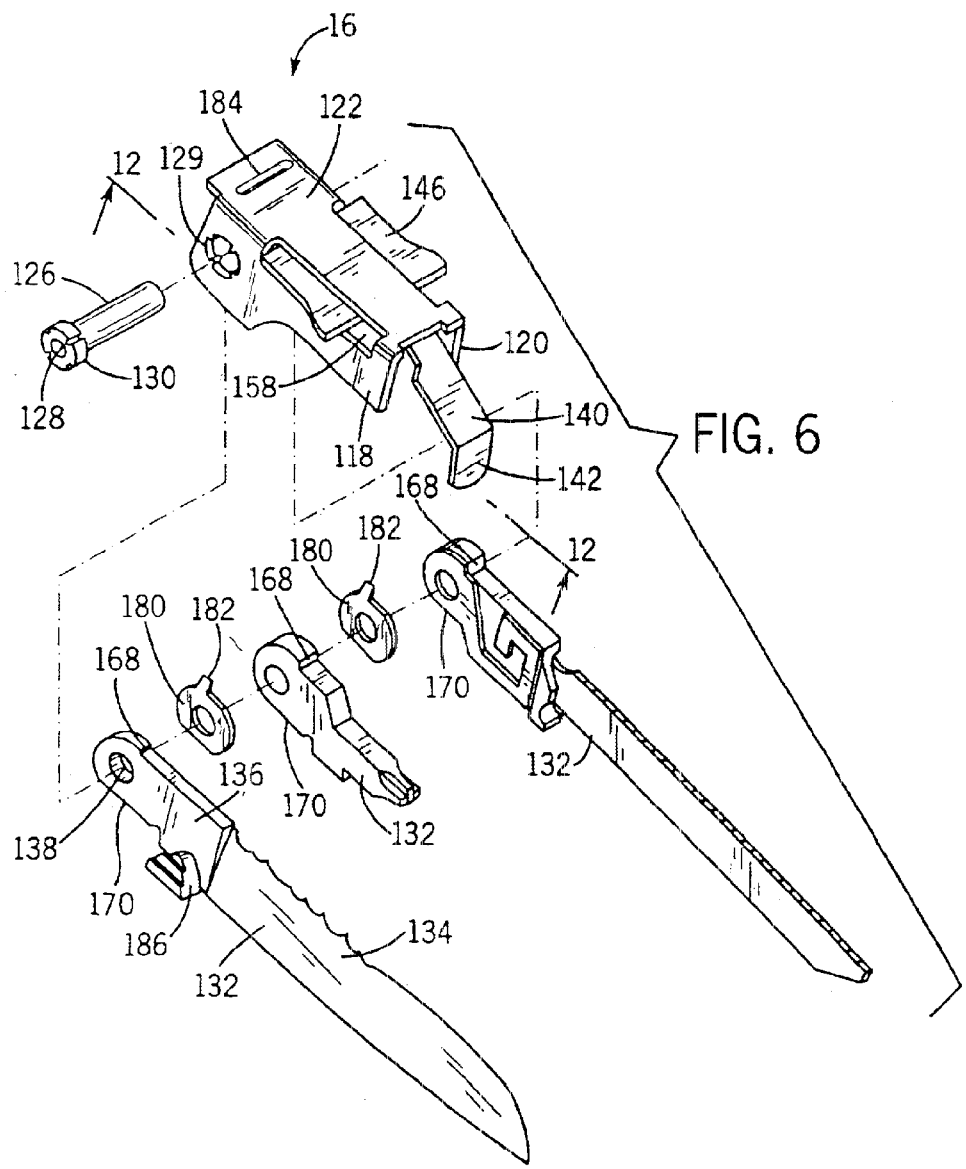
FIG. 6 is an exploded perspective view of the tool cartridge of the multi-function tool showing the assembly of the tool cartridge.
Figure 12:
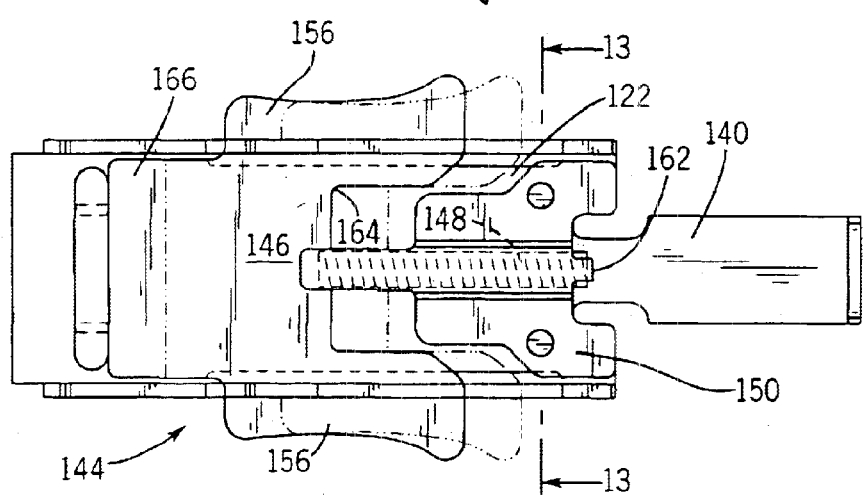
FIG. 12 is a sectional view taken generally along line 12—12 of FIG. 6.

Referring to FIGS. 5, 6, and 12, the tool cartridge 16 resides within each handle 12, 14. Because the tool cartridges 16 are similar, only one set of reference numerals will be used for convenience. The tool cartridge 16 has a first side 118, a second side 120, and a cartridge bottom 122 connecting the two sides. Each side 118, 120 fits into a cartridge recess 124 (see FIG. 5) in the first side 72 and the second side 74 of the handle 12.

In an exemplary embodiment, the cartridge bottom 122 is integral with the cartridge sides 118, 120 and extends the length of the tool cartridge 16. In an alternative embodiment, a portion of the cartridge bottom can comprise a plastic insert.

The use of the cartridge recesses 124 permits the capture of the tool cartridge 16 without the use of fasteners. The tool cartridge 16 may be inserted between the handle sides 72, 74 prior to assembly of the handle 12, 14, and captured therebetween once the handle sides 72, 74 are coupled together. The capture construction and method of assembly is superior because of the resultant reduction in parts, such as springs and fasteners, and lighter weight of the multi-function tool 10.

A cartridge axle 126, which may serve as second axle 24, 26, extends between the first side 118 and the second side 120 of the cartridge. The cartridge axle 126 can have threaded recesses 128 to receive screws 96 (see FIGS. 5 and 14). The cartridge 16 is secured to the handle 12 by means of screws 96 inserted through the second apertures 80, 82 of the handle and threaded into the cartridge axle recesses 128.

The cartridge axle 126 is used to adjust the tension of the ancillary tools 132. The cartridge axle 126 has a keyed head 130 that fits into a corresponding recess 129 in the tool cartridge 16. As a screw 96 is threaded into the recess 128 distal the keyed head 130, the keyed head 130 is drawn through the recess 129 to compress the ancillary tools 132. The interference between keyed head 130 and keyed opening 129 after assembly prevents the cartridge axle 126 from rotating. The amount of compression on the ancillary tools 132 after assembly is determined by the tightness of screws 96.

Referring to FIG. 6 number of ancillary tools 132 may be rotatably coupled to the cartridge axle 126. Each ancillary tool has a working portion 134 and a tang 136. The tang 136 has an aperture 138 through which the cartridge axle 126 travels. The tang 136 also has an associated notch 168 and an associated flattened portion 170. The working portion 134 of the ancillary tools 132 can include such implements as screwdrivers, files, scissors, knives, bottle openers, rulers, corkscrews, and assorted other cutting instruments.

Extending outward from the cartridge bottom 122 is a retaining finger 140. The retaining finger 140 is sloped away from the cartridge bottom 122. An end 142 of the retaining finger 140 extends at a greater angle relative to cartridge bottom 122.

Figure 13:
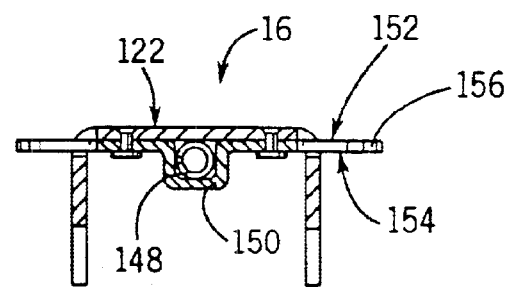
FIG. 13 is a sectional view taken generally along line 13—13 of FIG. 12.
Figure 15:
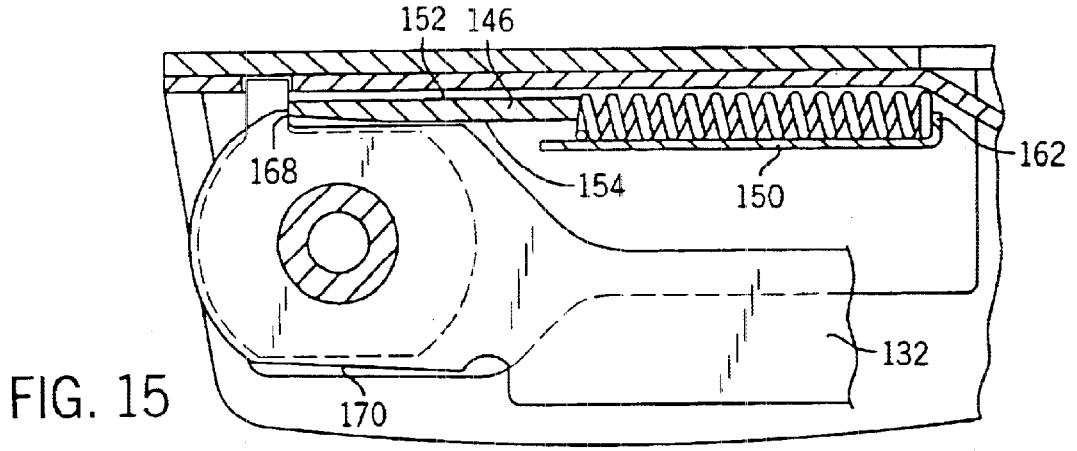
FIG. 15 is a sectional view taken generally along line 15—15 of FIG. 14 showing the position of the wedge lock when all ancillary tools are folded.

Referring to FIGS. 12 and 13, a wedge lock 144 includes a wedge plate 146, a compression spring 148, and a spring housing 150. The wedge plate 146 has a first planar side 152 disposed against the bottom 122 of the tool cartridge 16 and a second planar side 154 facing the ancillary tools 132 (FIG. 15). The second side 154 has a beveled region 166 distal compression spring 148. The wedge plate 146 has wings 156 that extend outward through the tool cartridge slots 158 (FIG. 6) and further through handle slots 84, 86 (FIG. 5). The wings 156 may have a serrated edge 157 (FIG. 18) to aid in frictionally engaging a user's thumb and fingers.

The wedge plate 146 retains one end of the compression spring 148. The compression spring 148 is located within the spring housing 150. The spring housing 150 is attached to the bottom 122 of the tool cartridge 16. The spring housing 150 has a spring retaining finger 162 on an end distal the wedge plate 146. The spring housing 150 is shaped to fit within a wedge plate notch 164 to allow the wedge plate 146 to be moved back and forth relative to the fixed spring housing 150.

When a plastic insert is used as a portion of the tool cartridge bottom 122, integral with the plastic insert can be the spring housing 150. The integral design eliminates the necessity of fasteners used to attach the spring housing 150 to the bottom 122 of the tool cartridge 16.

Figure 16:
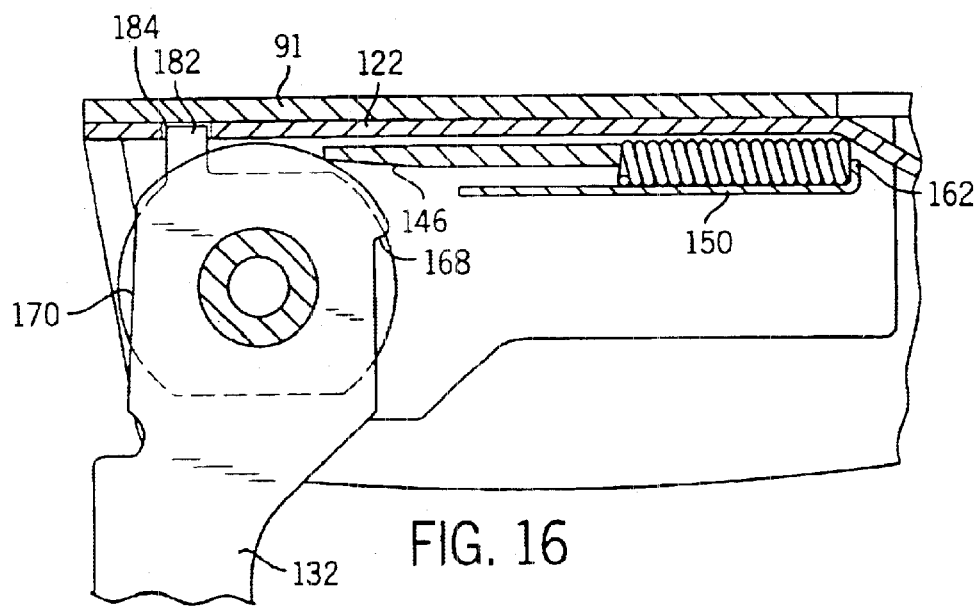
FIG. 16 is a sectional view taken generally along line 15—15 of FIG. 14, showing the position of the wedge lock when an ancillary tool is in a partially opened state.
Figure 17:
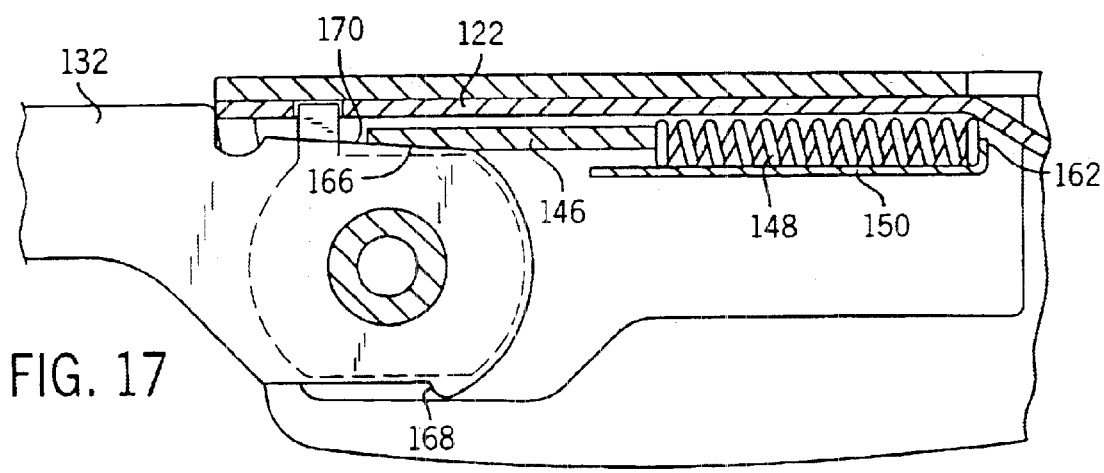
FIG. 17 is a sectional view along line 15—15 of FIG. 14 showing the position of the wedge lock when one or more ancillary tools are in the fully opened state.

FIGS. 15–17 show the operation of the wedge plate 146. When all of the ancillary tools 132 are in the closed position, the wedge plate 146 is biased against the notches 168 of the ancillary tools 132 as shown in FIG. 15. In this position, the wedge plate 146 provides a closing torque on the ancillary tools 132 to maintain the ancillary tools 132 in their closed position. The ancillary tools 132 are not locked in the closed position however, in that the ancillary tools 132 may be opened by the user without manually disengaging the wedge plate 146. The notch 168 of the ancillary tool 132 can move the wedge plate 146 away from its first operative position automatically as the ancillary tool 132 is rotated from its folded position. FIG. 16 shows the position of the wedge plate 146 when an ancillary tool is in an intermediate position between its fully closed and fully opened positions.

Once the ancillary tool 132 is in its fully opened position, the compression spring 148 biases the wedge plate 146 into the operative position shown in FIG. 17. In this position, the beveled region 166 of the wedge plate 146 is disposed against the flattened region 170 of the tang 136 of the opened ancillary tool 132. In the locked open position, the flattened region 170 is disposed at a slight angle relative to the tool cartridge bottom 122, creating a v-shaped opening for insertion of the wedge plate 146. In this position, the wedge plate 146 locks the ancillary tool 132 in the fully opened position, preventing rotation of the ancillary tool 132 until the wedge plate 146 is disengaged from the ancillary tool. In the position shown in FIG. 17, the remaining ancillary tools 132 may still be rotated into an opened position. The wedge plate 146 will lock multiple tools in their fully opened position if desired.

Referring to FIG. 17, when an ancillary tool 132 is locked open, the wedge plate 146 is pushed into an interference fit with the flattened region 170 of the locked ancillary tool 132 by the compression spring 148. The wedge plate 146 does not extend fully as shown in FIG. 15 when locking an ancillary tool 132. This design allows for greater variability in manufacturing tolerances. Wedge plate 146 rests against notch 168 of the closed ancillary tool 132 when all of such tools 132 are folded as shown in FIG. 15. If the wedge plate 146 were to reside in the same position when locking an ancillary tool 132 into the open position as shown in FIG. 17, variability in the positioning of the notch 168, or thickness of the wedge plate 146 could allow play in the fully opened tool 132. Thus the interference fit shown in FIG. 17 between beveled region 166 and flattened region 170 allows for more manufacturing variability.

To close a locked open ancillary tool 132, the wedge lock 144 must be disengaged from the ancillary tool 132. The disengagement may be effected in two ways. First, a user may retract the wedge plate 146 manually by grasping the wings 156 of the wedge plate 146 and moving the wedge plate 146 out from engagement with the tang 136 of the opened tool. A second way of disengaging the wedge plate 146 is to partially remove a second ancillary tool 132 from its closed position. When an ancillary tool 132 is rotated from its closed position toward its open position, the tang 136 of the ancillary tool 132 will automatically slide the wedge plate 146 away from its locked position. Therefore, if a second ancillary tool 132 is partially rotated from its closed position, the wedge lock 144 will be automatically unlocked (see FIG. 16), disengaging the beveled region 166 from the flattened portion 170 of the locked fully opened tool 132. The fully opened tool 132 may then be closed while the wedge plate 146 is disengaged.

Referring to FIG. 6, disposed between ancillary tools 132 are a number of washers 180. The washers 180 each have a profile that roughly matches the tangs 136 of the ancillary tools 132 when the ancillary tools 132 are in the closed position. The washers 180 have a washer finger 182 that extends into a transverse slot 184 in the bottom 122 of the tool cartridge 16. Because the washer fingers 182 extend into the transverse slot 184, the washers 180 do not rotate. Thus when an ancillary tool 132 is rotated about the cartridge axle 126, the adjacent ancillary tools 132 remain in position because the washer 180 prevents torque from being transmitted from the tool 132 being rotated to an adjacent tool 132.

Referring to FIG. 16, the washer finger 182 extends into the transverse slot 184. Next to the transverse slot 184 is the web 91, which does not have a corresponding slot. Accordingly, the washer 182 and the slot 184 are not visible from the exterior of an assembled handle 12, 14 because the web 91 covers the slot 184.

To rotate the ancillary tools 132 from their folded to their opened position, the user must grasp or engage the ancillary tools 132 in some fashion. Conventional handle designs have a cut-out portion in the sides of the handles 12, 14 to allow a user to access a tool 132 disposed adjacent to the side 72 of the handle 12, 14. The tool 132 conventionally has a recessed portion that a user may insert a fingernail into to aid in rotating the tool 132 from its closed position.

Referring to FIGS. 3 and 5, instead of a cut-out portion in the handle 12, 14, the multi-function tool 10 has an ancillary tool 132 with a nub 186 that a user may use to engage the ancillary tool adjacent the side of the handle 12, 14. The nub 186 resides in a handle notch 190 when the ancillary tool 132 is in the stowed position (see FIG. 1). The user may easily open the stowed tool by engaging the nub 186 to pivot ancillary tool 132 from within the handle 12, 14. Preferably, the surface of the nub 186 is textured to aid in engaging with the user's thumb or finger.

An ancillary tool 132 disposed inward from the sides of the handles 12, 14 may have a catch structure 188 (see FIG. 3) that a user may use to rotate an interior ancillary tool 132 outward without first rotating the other ancillary tools 132 that are closer to the handle 12, 14 sides outward.

Referring to FIGS. 5 and 7, the spring arm insert 68 is disposed between handle sides 72, 74 proximate the jaw tang 38. The spring arm 70 (and similarly, spring arm 71 for the opposing handle 14) extends from the spring arm insert 68.

The spring arm insert 68 has associated first and second sides 192, 194 and a bottom 196. The first and second sides 192, 194 of the spring arm insert 68 fit into a spring arm recess 198 in the first and second sides 72, 74 of the handles 12, 14. The spring arm insert 68 is captured within the handle 12, 14 once the first side 72 and the second side 74 of the handle 12, 14 are assembled together.

Referring to FIG. 4, one of the ancillary tools 132 may be a scissors tool 200. The scissors tool 200 is of two-piece 202, 204 construction, each piece 202, 204 includes a working portion 134 and a tang 136. The tang 136 of the first scissors piece 202 pivots on the cartridge axle 126, while the tang 136 of second scissors piece 204 coacts with user's thumb to operate the scissors 200. A scissors axle 206 couples the two scissors pieces 202, 204. The tang 136 of the second scissors piece 204 has a ledge 208 that coacts with a wire loop spring 210. The wire loop spring 210 forces the second scissors piece 204 away from the first scissors piece 202, thus opening the scissors 200. Thus, the scissors 200 may be operated by repeatedly pressing down on the tang 136 of second scissors piece 204 to perform a cutting motion, then releasing pressure from the tang 136 to again open the working portions 134 of the scissors 200. The second scissors piece 204 is rotated away from the wire loop spring 210 in the direction of the arrow in FIG. 4 into the configuration shown in FIG. 3 to prepare the scissors 200 for storage.

To remove the scissors 200 from its folded position in the handle 12 and into its operational position shown in FIG. 4, the scissors 200 must first be rotated 180 degrees about axle 24. The second scissors piece 204 is then rotated in the opposite direction about scissors axle 206. Rotating the second piece 204 results in a final configuration wherein the tang 136 is positioned above the rest of the folded ancillary tools 132 in the channel 99. The operational configuration of the scissors 200 permits effective use of the scissors 200 when the multi-function tool 10 is in its folded configuration.

The operational configuration wherein the tang 136 of the scissors 200 is above the channel 99 rather than the web 91 permits further travel of the tang 136 when using the scissors 200 because the tang 136 may travel into the channel 99, rather than having its travel blocked by the web 91. Further, the user may exert a greater degree of torque on the tang 136 as the tang 136 approaches the first scissors piece 202, so allowing a greater degree of travel in that direction can permit more effective use of the scissors 200.

As shown in FIG. 2, the multi-function tool 10 folds into a compact orientation. The head 11 as well as the ancillary tools 132 may be stowed within the folded handles 12, 14. The ancillary tools 132 may be opened from handles 12, 14 while the multi-function tool 10 is in the folded or opened position. When an ancillary tool 132 is opened from the handles 12, 14 when the multi-function tool 10 is in the folded position, the curved profile of the handles 12, 14 fits the user's hand to allow more effective use of the ancillary tool 132.

Figure 11:
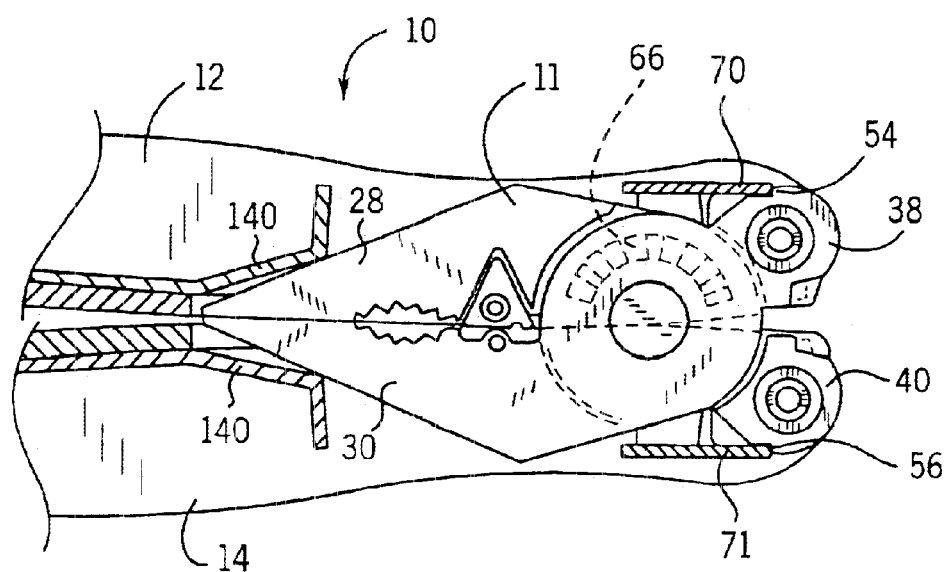
FIG. 11 is a sectional view of the multi-function tool in the fully closed position.

Referring to FIG. 11, the head spring 66 maintains a positive closing force on the handles 12, 14 of the multi-function tool 10 while the multi-function tool 10 is in the folded position. The head spring 66 forces the jaws 28, 30 into the open position. When the jaws 28, 30 are in the open position, the jaw tangs 38, 40 are also separated from one another. Therefore, the head spring 66 also forces the tangs 38, 40 of the jaws 28, 30 apart from one another. When the handles 12, 14 are in the folded position, the spring arms 70, 71 rest within the second detent 54, 56 of the jaw tangs 38, 40. Each spring arm 70, 71 is fixed with respect to its particular handle 12, 14. However, because the head spring 66 is forcing the jaw tangs 38, 40 apart from one another, the tangs 38, 40 are exerting a force on the spring arms 70, 71, which in turn force the handles 12, 14 into the folded position. The second detents 54, 56 maintain the spring arms 70, 71 in position on the tang 38, 40 such that the force of the head spring 66 maintains the handles 12, 14 closed, rather than allowing the spring arms 70, 71 to ride on the cammed surface of the tangs 38, 40 of the jaws 28, 30.

Referring to FIG. 8, the force the head spring 66 exerts on the handles 12, 14 is reversed when the multi-function tool 10 is in the unfolded position. When the multi-function tool 10 is in the unfolded position, the spring arms 70, 71 rest on the first flattened portion 58, 60 of the jaw tangs 38, 40. The spring arms 70, 71 rest against the first detent 50, 52 of the jaw tangs 38, 40. Thus, when the head spring 66 forces the jaw tangs 38, 40 apart from one another, the tangs 38, 40 force the handles 12, 14 apart from one another as well. When a user forces the handles 12, 14 toward one another while the multi-function tool 10 is in the unfolded position to the close the jaws 28, 30 toward one another, the user's force applied to the handles 12, 14 is transferred to the tangs 38, 40 of the jaws 28, 30 by the spring arms 70, 71. When the jaws 28, 30 close onto another object, or meet up with one another, the handles 12, 14 do not continue movement toward one another because the spring arms 70, 71 are prevented from moving relative to tangs 38, 40 of jaws 28, 30 by the first detent 50, 52. When the user wishes to fold up the tool, the handles 12, 14 may be rotated apart from one another because the spring arms 70, 71 are not prevented from riding along the cammed surface of the tangs 38, 40 of the jaws 28, 30 in that direction.

Figure 10:
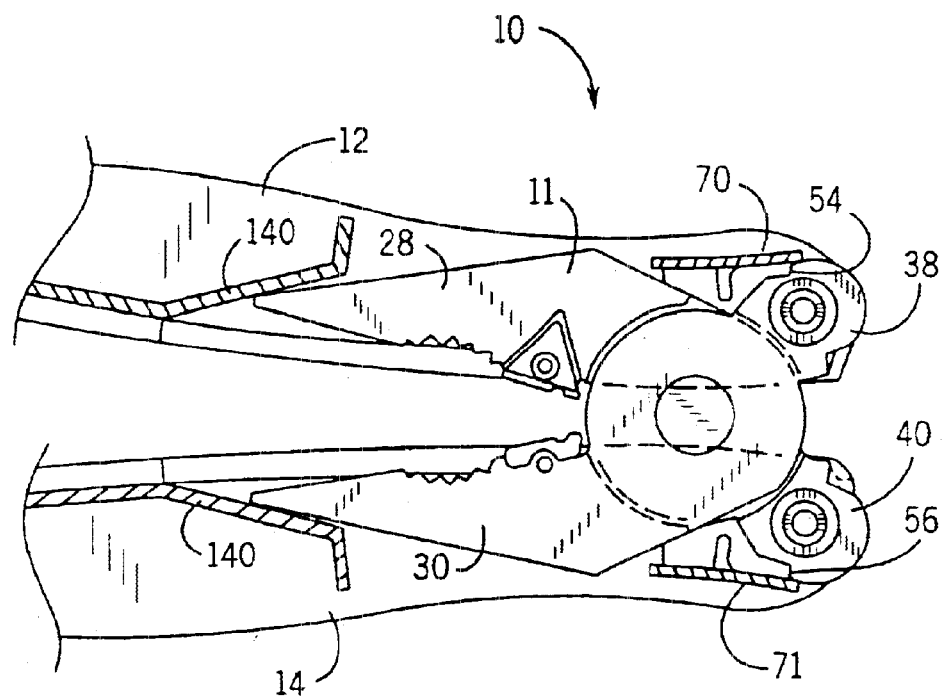
FIG. 10 is a fragmentary sectional view of the mulit-function tool in an intermediate position between the fully closed and fully opened positions.

Referring to FIGS. 10 and 11, when the multi-function tool 10 is folded into the closed position, the jaws 28, 30 travel through the longitudinal openings 98 (FIG. 18) and nest into the handles 12, 14. Further travel through the handle 12, 14 by either jaw 28, 30 is prevented by the retaining finger 140 of the cartridge. The retaining finger 140 is sloped to guide the jaws 28, 30 into their folded position.

While several embodiments of the invention have been described, it should be apparent to those skilled in the art that what has been described is considered at present to be the preferred embodiments of a multi-function tool 10 and a method of manufacture of the mulit-function tool 10. However, changes can be made in the design without departing from the true spirit and scope of the invention. The following claims are intended to cover all such changes and modifications which fall within the true spirit and scope of the invention.

What is claimed is:

1. A multi-function tool, comprising:
 a head having a first jaw and a second jaw joined at an axis;
 the first jaw having a working portion and a tang;
 the second jaw having a working portion and a tang;
 a first handle coupled to the first jaw, the first handle having a first channel with a handle side having a recess of a recess depth and a recess shape;
 a second handle coupled to the second jaw, the second handle having a second channel;
 a first tool cartridge captured in the first channel, the first tool cartridge having a cartridge side, a first cartridge axle and a plurality of ancillary tools pivotally coupled to the first cartridge axle, wherein the cartridge side has a shape matching the recess shape and a thickness substantially similar to the recess depth wherein the cartridge side is nested in the recess; and
 a wedge lock releasable locking one or more of the ancillary tools into an open position.

2. The multi-function tool of claim 1, further comprising:
 a second tool cartridge captured in the second channel, the second tool cartridge having a second cartridge axle and a plurality of ancillary tools pivotally coupled to the second cartridge axle.

3. The multi-function tool of claim 1, further comprising:
 a plurality of washers, non-rotatably coupled to the first cartridge axle, the washers disposed between the ancillary tools.

4. The multi-function tool of claim 3, further comprising:
 a slot in the tool cartridge, wherein the washers each have a washer finger disposed in the slot.

5. The multi-function tool of claim 1, further comprising:
 a nub located on at least one of the ancillary tools; and
 a notch in one of the handles, wherein when the at least one of the ancillary tools is closed, the nub fits into the notch.

6. The multi-function tool of claim 1, wherein the wedge lock comprises a spring-biased wedge plate.

7. The multi-function tool of claim 6, wherein the wedge lock biases one or more of the tools into a folded position when no ancillary tools are in the fully opened position.

8. The multi-function tool of claim 6, wherein the wedge lock biases one or more of the tools into a partially closed position when one or more of the ancillary tools is in the fully opened position.

9. A tool cartridge for a multi-function tool, comprising:
 a first side having a first slot;
 a second side having a second slot;
 a bottom connecting the first and second sides;
 a cartridge axle disposed between the first and second sides;
 a plurality of ancillary tools pivotally connected to the cartridge axle; and
 a wedge lock releasably locking one or more of the ancillary tools into an open position, the wedge lock having a pair of wings extending from a wedge plate, the wings extending though the first and second slots.

10. The tool cartridge of claim 9, further comprising:
 a retaining finger extending from the bottom.

11. The tool cartridge of claim 9, wherein the wedge lock further comprises a spring biasing the wedge plate toward the cartridge axle.

12. The tool cartridge of claim 9, wherein each of the wings has a textured edge to facilitate grasping by the user.

13. The tool cartridge of claim 9, further comprising:
 a plurality of washers disposed on the cartridge axle, wherein the washers are prevented from rotating on the axle.

14. The tool cartridge of claim 13, wherein the washers are prevented from rotating by a washer finger that extends though a slot in the bottom.

15. The tool cartridge of claim 9, wherein more than two ancillary tools are coupled to the cartridge axle.

16. The tool cartridge of claim 9, further comprising:
 two threaded recesses in opposing ends of the cartridge axle,
 whereby a handle side may be attached to the cartridge axle by means of a threaded fastener.

17. A multi-function tool, comprising:

a head having a first jaw and a second jaw joined at an axis;

a handle coupled to one of the first jaw and the second jaw, the handle having a plurality of ancillary tools pivotally coupled thereto;

a first handle side having a first interior surface, the first handle side having a tongue;

a second handle side having a second interior surface, the second handle side having a groove configured to receive the tongue;

wherein the first handle side is coupled to the second handle side such that the first interior surface faces the second interior surface; and at least one recess disposed in each interior surface, shaped to receive and hold captive an additional component.

18. The multi-function tool of claim 17, wherein the additional component is a spring arm insert.

19. The multi-function tool of claim 17, wherein the additional component is a tool cartridge.

20. The multi-function tool of claim 17, wherein the additional component is an axle.

21. The multi-function tool of claim 19, further comprising:

a longitudinal slot in each of the sides, a wedge plate disposed within the tool cartridge;

a pair of wings extending from the wedge plate; and a pair of cartridge slots in the tool cartridge substantially aligned with the longitudinal slots;

wherein the wings extend though the cartridge slots and the longitudinal slots.

22. A multi-function tool, comprising:

a head having a first jaw and a second jaw joined at an axis;

the first jaw having a working portion and a tang;

the second jaw having a working portion and a tang;

a first handle coupled to the first jaw, the first handle having a first channel with a handle side having a recess of a recess depth and a recess shape;

a second handle coupled to the second jaw;

a first tool cartridge captured in the first channel, the first tool cartridge having a cartridge side, a first cartridge axle, and a plurality of ancillary tools pivotally coupled to the first cartridge axle, wherein the cartridge side has a shape matching the recess shape and a thickness substantially similar to the recess depth wherein the cartridge side is nested in the recess; and a wedge lock coupled to one of the handles, wherein the wedge lock is configured to selectively lock a plurality of the ancillary tools into a fully opened position or bias a plurality of the ancillary tools into a fully folded position.

23. The multi-function tool of claim 22, wherein the wedge lock is configured to simultaneously lock a plurality of the ancillary tools into the fully opened position and bias a plurality of the ancillary tools into a partially folded position.

24. The multi-function tool of claim 22, wherein the wedge lock comprises a spring-biased wedge plate.

25. A tool cartridge far a multi-function tool, the multi-function tool having a pair of jaws coupled to a pair of handles, comprising:

a first side having a first keyed aperture defined therein;

a second side having a second aperture defined therein;

a bottom connecting the first and second sides;

a retaining finger extending at an angle from the bottom, the retaining finger configured to retain one of the jaws in position when the handles are in a closed configuration;

a cartridge axle having a keyed head disposed between the first and second sides; and a plurality of ancillary tools pivotally connected to the cartridge axle wherein the keyed head is configured to travel through the first keyed aperture to clamp the plurality of ancillary tools together.

* * * * *